(12) United States Patent
Inabinet et al.

(10) Patent No.: US 8,341,530 B1
(45) Date of Patent: Dec. 25, 2012

(54) CUSTOMER SERVICE CENTER DATABASE MANAGEMENT

(75) Inventors: Greg Inabinet, Centreville, VA (US); Denise V. Kampman, Kearney, MO (US); Misty Taylor, Pleasant Hill, MO (US); Lance Williams, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 564 days.

(21) Appl. No.: 12/628,875

(22) Filed: Dec. 1, 2009

(51) Int. Cl.
*G06F 3/00* (2006.01)
(52) U.S. Cl. ......... 715/741; 715/809; 715/825; 715/853
(58) Field of Classification Search .................. 715/809, 715/825, 741, 853
See application file for complete search history.

(56) References Cited

U.S. PATENT DOCUMENTS

| | | | | |
|---|---|---|---|---|
| 7,212,543 | B1 * | 5/2007 | Arwald et al. | 370/466 |
| 7,483,690 | B2 * | 1/2009 | Muramatsu et al. | 455/410 |
| 7,808,986 | B2 * | 10/2010 | Giaretta et al. | 370/389 |

* cited by examiner

*Primary Examiner* — Andrey Belousov

(57) ABSTRACT

Systems and methods provide customer service center database management. A management component may identify an application accessible at a location based on a user profile and hardware component requirements for the application. The component may promote upgrading hardware components if the location's hardware components do not meet the requirements. The component may identify a user profile for a location and a communication route for the user profile. The management component may promote a change in a communication route to the location for the user profile if the route to the location does not correspond to the route for the user profile. The component may identify a first location's user profile that is similar to a second location's user profile. The component promotes modification of the first user profile to match the second user profile and of a route for the second user profile to a route for the first user profile.

19 Claims, 3 Drawing Sheets

CUSTOMER SERVICE CENTER DATABASE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise that provides customer service may have multiple customer service centers at multiple locations to communicate with the enterprise's customers by phone calls and other electronic messages to respond to service requests from the customers. Multiple agents may work at each customer service center, using multiple hardware components to access multiple computer applications based on user profiles that specify a level of access for each agent to each application. The applications may reside and execute locally on hardware components at a customer service center and/or the applications may be accessed remotely by the hardware components at the customer service center. Examples of agents include customer care agents, technical support agents, sales agents, and collections agents.

SUMMARY

In some embodiments, a system is provided for customer service center database management. The system includes a processor, a memory, and a management component stored in the memory. When executed by the processor, the management component identifies an application accessible at a location based on a user profile associated with the location, and identifies a set of hardware components for supporting the identified application. The management component outputs a message to a user interface that promotes an upgrade of a set of hardware components at the location if each set of hardware components at the location does not meet the requirements for the identified set of hardware components.

In some embodiments, a method is provided for customer service center database management. A management component, stored in a memory and executed by a processor, identifies a user profile associated with a location, and identifies a communication route associated with the identified user profile. The management component outputs a message to a user interface that promotes a change in a communication route to the location for the identified user profile if the communication route to the location does not correspond to the communication route associated with the identified user profile.

In some embodiments, a system is provided for customer service center database management. The system includes a processor, a memory, and a management component stored in the memory. When executed by the processor, the management component identifies a first user profile associated with a first location that is most similar to a second user profile associated with a second location, wherein similarity is based on multiple access levels corresponding to multiple applications. The management component also outputs a first message to a user interface that promotes modification of the first user profile to match the second user profile, and outputs a second message to the user interface that promotes a modification of a communication route associated with the second user profile to a communication route associated with the first user profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
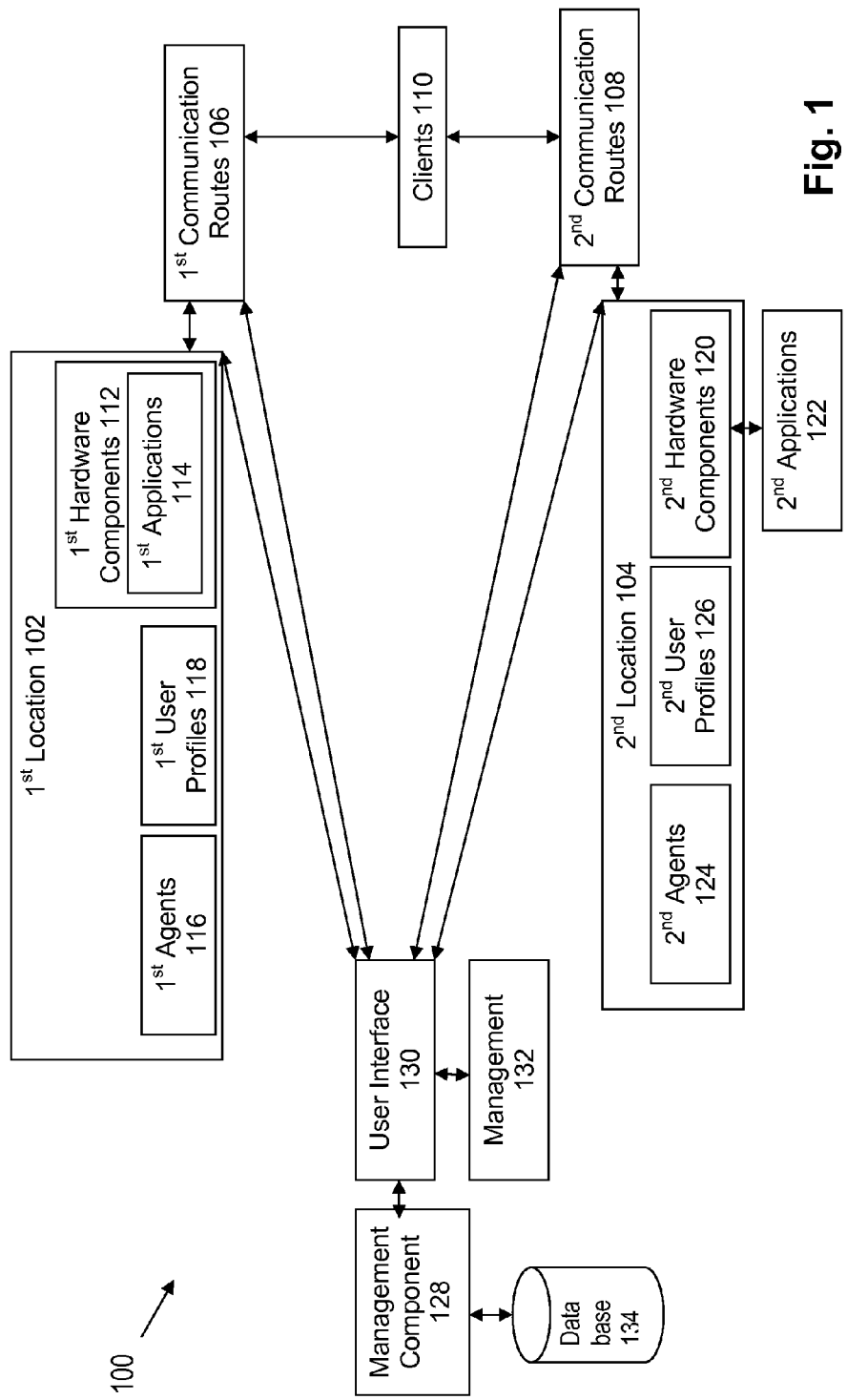
FIG. 1 is a block diagram of a system for customer service center database management according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches defining and managing a limited number of user profiles to configure and manage the computer system resources employed by enterprise employees, for example call center employees, to perform their tasks. A user profile may define computer application execution privileges and access to networks and/or subnets. The user profile may define authorization levels of a user, for example defining a dollar value limit to how much of a subscriber bill the subject user is authorized to dismiss or otherwise alter. The user profile may define types of information that the subject user is authorized to read and/or write. The user profile may define a canonical load set of applications that are to be installed on a desktop computer used by the subject user. The user profile may define a customer care routing rule that an automatic call distribution device may use to forward customer service calls to the subject user.

In one communication service provider call center, it was found that almost every call center worker had a different user profile and that there was no standardization of user profiles. Elements of user profiles were modified ad hoc and with little regard for harmonization of user profiles among call center employees performing substantially the same role and/or the same job. Such a call center may have thousands of employees. Across the entire organization, the communication service provider may have 50,000 call center employees. In this environment of ad hoc user profiles, it was an intractable problem to determine whether a call center employee had the correct user profile established or not. When there was a need to rapidly configure a large number of computers for call center employees to address surge needs of another call center, for example during a special marketing promotion, it was difficult to determine what the correct components of the needed user profile would be. In practice, many times establishing new user profiles was a trial and error process, as the information technology worker responsible for defining the new user profile could not refer to any standard user profiles.

By defining a limited number of user profiles, for example, but not by way of limitation, about 20 user profiles, it can be more readily determined which of the user profiles is most suitable to a new business circumstance, for example bringing up a call center to support a new product line and/or to temporarily increase the staffing of a call center during a peak load period. In an embodiment, a management component associates a role with an employee, analyzes the tasks performed by an employee in the subject role, and identifies one of the limited number of user profiles that is suitable to an employee in the subject role. The management component may automatically configure a computer associated with the subject employee. Alternatively, the management component may transmit a document to an information technology worker and/or administrator responsible for configuring the computer associated with the subject employee based on the document.

In an embodiment, the user profile may be associated with a user at the time of logging into a computer system and may be used to assign access and privileges at that time. This may enable a user to log into any suitably configured computer to perform their assigned job, which in some contexts may be referred to as "hot seating" on a computer, so long as the computer system has a minimal set of applications and hardware configuration.

FIG. 1 is a block diagram of a system 100 for customer service center database management according to some embodiments of the present disclosure. The system 100 includes a first location 102, a second location 104, first communication routes 106, second communication routes 108, and clients 110. The first location 102 communicates with the clients 110 via the first communication routes 106, while the second location 104 communicates with the clients 110 via the second communication routes 108. In some embodiments, the first location 102 may be a first customer service center 102 and the second location 104 may be a second customer service center 104, and may be referred to as such.

The first customer service center 102 may include first hardware components 112 that execute first applications 114 that reside locally on the first hardware components 112. First agents 116 access the first applications 114 based on first user profiles 118 that specify levels of access that correspond to each of the first applications 114 for each of the first agents 116. In some contexts, agents may be referred to as customer service personnel and/or customer care personnel. Similarly, the second customer service center 104 may include second hardware components 120 that execute second applications 122 that reside remotely from the second hardware components 120 and are remotely accessed. Second agents 124 access the second applications 122 based on second user profiles 126 that specify levels of access that correspond to each of the second applications 122 for each of the second agents 124.

The hardware components 112 and 120 may include a computer, a processor, a memory, an operating system, a monitor, a keyboard, a mouse, and/or a headset. The combination of hardware components that enable an agent to respond to requests may be referred to as a set of hardware components. The first hardware components 112 at the first location 102 may be configured based on hardware build-out specifications defined for the first location 102 and the second hardware components 120 at the second location 104 may be configured based on hardware build-out specifications defined for the second location 104. For example, the first hardware components 112 may have the storage capacity to store all of the first applications 114 locally, but the second hardware components 120 may not have the storage capacity to store all of the second applications 122 locally because the second hardware components 120 access the second applications 122 remotely on an as-needed basis.

The access to each of the applications 114 and 122 may be defined, at least in part, by the user profiles 118 and 126. As an example, but not by way of limitation, the user profiles 118 and 126 may identify accessible websites associated with a browser application. For example, the user profiles 118 and 126 for the technical support agents may enable the technical support agents to access technical websites on the Internet, but the user profiles 118 and 126 for the customer care agents may not enable the customer care agents to access the technical websites on the Internet. The user profiles 118 and 126 further may define what data may be read and/or written, what applications may be executed, and other resources available to the subject users.

The first user profiles 118 may be based on the first location 102 and the roles of employees working at the first location 102 and the second user profiles 126 may be based on the second location 104 and the roles of employees working at the second location 104. For example, supposing the first location 102 supports post-paid account subscribers while the second location 104 supports pre-paid account subscribers, the first user profiles 118 may enable the first agents 116 to provide customer care services at the first customer service center 102 for post-paid accounts, while the second user profiles 126 may enable the second agents 124 to provide customer care services at the second customer service center 104 for pre-paid accounts.

The system 100 also includes a management component 128, a user interface 130, management 132, and a database 134. The management component 128 may access information about the customer service centers 102 and 104, the communication routes 106 and 108, the hardware components 112 and 120, the applications 114 and 122, the agents 116 and 124, and the user profiles 118 and 126, that is stored in the database 134. The management component 128 may output messages to the management 132 via the user interface 130. The management component 128 may be executed by a computer system, such as the computer system discussed below in reference to FIG. 3.

The user interface 130 is depicted in FIG. 1 as a single unit. In some embodiments of the present disclosure, the same user interface 130 may enable the management 132 to communicate with the management component 128 and with the customer service centers 102 and 104 and the communication routes 106 and 108. In other embodiments of the present disclosure, the user interface 130 may be implemented by separate user interfaces 130. One of the separate user interfaces 130 may enable the management 132 to communicate with the management component 128, while another one of the separate user interfaces 130 may enable the management 132 to communicate with the customer service centers 102 and 104 and the communication routes 106 and 108. In an embodiment, the communication routes 106 and 108 are associated with automated call distribution equipment. The same user interface 130 that communicates with the customer service centers 102 and 104 and the communication routes 106 and 108 can obtain information about the customer service centers 102 and 104, the communication routes 106 and 108, the hardware components 112 and 120, the applications 114 and 122, the agents 116 and 124, and the user profiles 118 and 126 and store this information into the database 134 for access by the management component 128. Alternatively, one separate user interface 130 may obtain the information and another separate user interface 130 may store this information into the database 134. Furthermore, the management 132 may supplement the process of obtaining the information by conducting audits of the information, which may involve a combination of automatically obtaining information and humans obtaining information.

FIG. 1 depicts the system elements 102-134 for the purpose of an example, as the system 100 may include any number and type of the system elements 102-134. Some details and/or elements of the system 100 are not shown or described so as to not crowd FIG. 1 with details. It is a teaching of the present disclosure that the total number of different user profiles 118, 126 across the system 100 is constrained to a relatively small number, for example less than 100 different user profiles and preferably less than about 25 different user profiles. Constraining the number of different user profiles may promote ease of auditing call center employee computer set-ups, for example to assure security objectives and to assure quality handling of calls to customer care. Additionally, constraining the number of different users may make it easier to definitively initiate a computer set-up for a new employee or to initiate computer set-ups for employees to collaborate with other call centers during a surge work load.

The management component 128 may track information related to the agents 116 and 124, the user profiles 118 and 126, and the applications 114 and 122 to enable standardization of the user profiles 118 and 126 and audits of agent access to the applications 114 and 122. The management component 128 may modify an identified user profile to match a set of user profiles. For example, if the management component 128 identifies a user profile for a customer care agent supervisor who works at the first location 102 that does not match the user profiles for the other customer care agent supervisors who work at the first location 102, the management component 128 modifies the non-matching user profile to match the matching user profiles. The management component 128 may modify an identified user profile to increase or decrease a level of access to an application based on a set of user profiles. For example, the management component 128 increases the level of access to an application for the customer care agent supervisor to match the level of access to the application by the other customer care agent supervisors.

The management component 128 may create a new profile and modify or clone multiple user profiles to match the new profile. For example, if a technical support agent at the first location 102 requests an increased level of access to a technical support application, and the management 132 approves this request, the management component 128 creates a new user profile for technical support agents at the first location 102 and modifies the user profiles of the technical support agents at the first location to match the newly created user profile. Alternatively, the management component 128 may clone the new profile and assign each of the technical support agents at the first location to use their own password-protected instance of the cloned profile. If an agent requests an increase in the level of access to an application, the management 132 may evaluate whether to provide the increase in the level of access to the application for all agents with the same user profile or none of the agents with the same user profile, thereby insuring that standardization of user profiles is maintained.

The management component 128 may output a hierarchy of user profiles to the user interface 130. For example, the user interface 130 displays the user profiles for the customer care agents and the customer care supervisors at the first customer service center 102. The hierarchy of user profiles may identify a level of access to an application associated with a subordinate user profile that is greater than a level of access to the application associated with a supervising user profile. For example, the hierarchy of user profiles displayed to the management 132 by the user interface 130 may indicate that the customer care agents at the first location 102 have greater access to an application than the customer care agent supervisors at the first location 102. The management 132 may respond to the display of this hierarchy of user profiles by modifying the first user profiles 118 for the customer care agents and/or the customer care agent supervisors.

The management component 128 also may track information related to the hardware components 112 and 120 at the customer service centers 102 and 104 and communication routes 106 and 108 to the customer service centers 102 and 104. The management component 128 may insure that the first hardware components 112 at the first customer service center 102 support all of the first applications 114 that may be accessed at the first customer service center 102. The management component 128 may identify an application accessible at the first location 102 based on a user profile associated with the first location 102, and may identify a set of hardware components for supporting the identified application. For example, the management component 128 identifies which applications 114 may be accessed at the first customer service center 102 based on the first user profiles 118 for the first agents 116 working at the first customer service center 102 and identifies which hardware components are required to support the identified applications 114.

The management component 128 may output a message to the user interface 130 that promotes an upgrade of a set of hardware components at the first location 102 if each set of the hardware components 112 at the first location 102 does not meet the requirements for the identified set of hardware components. For example, if the management component 128 identifies that some of the first hardware components 112 at the first customer service center 102 do not meet the requirements for supporting the identified applications, the management component 128 outputs a request to upgrade the identified hardware components to meet the requirements. Upgrading the identified hardware components may result in all of the sets of the first hardware components 112 at the first location 102 being able to support all of the applications 114 that may be executed at the first location 102, which provides each of the first agents 116 at the first location 102 with the flexibility to use any of the sets of the first hardware components 112 at the first location 102.

The management component 128 may insure that the incoming requests match the capabilities of the agents 116 and 124 that receive the requests. For example, during a promotional campaign that required a significant increase in customer care service for pre-paid accounts, some of the first communication routes 106 to the first customer service center 102 were changed to route customer care requests for pre-paid accounts to some of the first agents 116 at the first customer service center 102. When the promotional campaign is over and the number of customer care requests for pre-paid accounts returns to normal, the management component 128 may conduct an audit to insure that the first communication routes 106 have been modified to route customer care requests for post-paid accounts to all of the first agents 116 at the first customer service center 102.

The management component 128 may identify a user profile associated with the first location 102, and identify a communication route associated with the identified user profile. For example, the management component 128 identifies the user profiles 118 for each customer care agent working at the first customer service center 102 and identifies the communication routes 106 for requests for customer care agents. The management component 128 may output a message to the user interface 130 that promotes a change in a communication route to the first location 102 for the identified user profile if the communication route to the first location 102 does not correspond to the communication route associated with the identified user profile.

For example, if the management component 128 determines that a communication route to the first customer service center 102 for a customer care agent does not currently route customer care requests, the management component 128 outputs a message to change the communication route to the customer care agent to route customer care requests to the customer care agent. The corresponding level of access to each of the applications 114 and 122 may include a level of access for the clients 110 communicating with the locations 102 and 104. For example, the management component 128 verifies that the communication route that routes requests to the customer care agent prompts an automatic recording from a customer care application while a client is waiting to speak with a customer care agent, and may output a message to change the automatic recording if another recording is currently selected to respond to such incoming customer care requests. Insuring that the incoming requests match the capabilities of the agents 116 and 124 receiving the requests provides each agent at any of the locations 102 and 104 with the flexibility to use any of the sets of the hardware components 112 and 120 at the locations 102 and 104 because the appropriate requests may be routed to any of the sets of the hardware components 112 and 120.

The management component 128 may enable the first agents 116 at the first location 102 to provide the services of the second agents 124 at the second location 104. The management component 128 may identify a first user profile associated with the first location 102 that is most similar to a second user profile associated with the second location 104, wherein similarity is based on multiple access levels corresponding to the applications 114 and 122. For example, the management component 128 identifies the customer care agents at the first customer service center 102 for post-paid accounts that have the first user profiles 118 which are most similar to the second user profiles 126 for customer care agents at the second customer service center 104 for pre-paid accounts.

The management component 128 may output a first message to the user interface 130 that promotes modification of the first user profile to match the second user profile. For example, the management component 128 outputs a message to modify the first user profiles 118 for the identified customer care agents at the post-paid account customer service center 102 to match the second user profiles 126 for the customer care agents at the pre-paid account customer service center 104. The management component 128 may output a second message to the user interface 130 that promotes a modification of a communication route associated with the second user profile to a communication route associated with the first user profile. For example, the management component 128 may output a message to modify the communication routes 108 to the pre-paid customer service center 104 to the communication routes 106 to the post-paid customer service center 102 to enable customer care requests for pre-paid accounts to be routed to the customer care agents with the modified user profiles at the post-paid customer service center 102. Enabling the first agents 116 at the first location 102 to provide the services of the second agents 124 at the second location 104 provides greater flexibility for an enterprise during times of changing service needs, such as during promotional campaigns that require a significant increase in specific types of service or during problems when a specific customer service center may be unavailable for providing services.

The management component 128 may output a report associated with the locations 102 and 104 to the user interface 130, wherein the report specifies a number of the agents 116 and 124, a schedule, and a number of each type of the user profiles 118 and 126. For example, the report may specify how many agents work at each customer service center, how many agents are currently working at each customer service center, how many of each type of user profile is used at each customer service center, and how many of each type of user profile is currently being used at each customer service center. Such a report may provide the management 132 with an overview of work capacities at the locations 102 and 104 and the levels of access to the applications 114 and 122 at the locations 102 and 104. The management component 128 may enable an enterprise to manage the hardware components 112 and 120, the communication routes 106 and 108, the agents 116 and 124, and the user profiles 118 and 126 at the customer service centers 102 and 104 in a flexible yet standardized manner.

Figure 2:
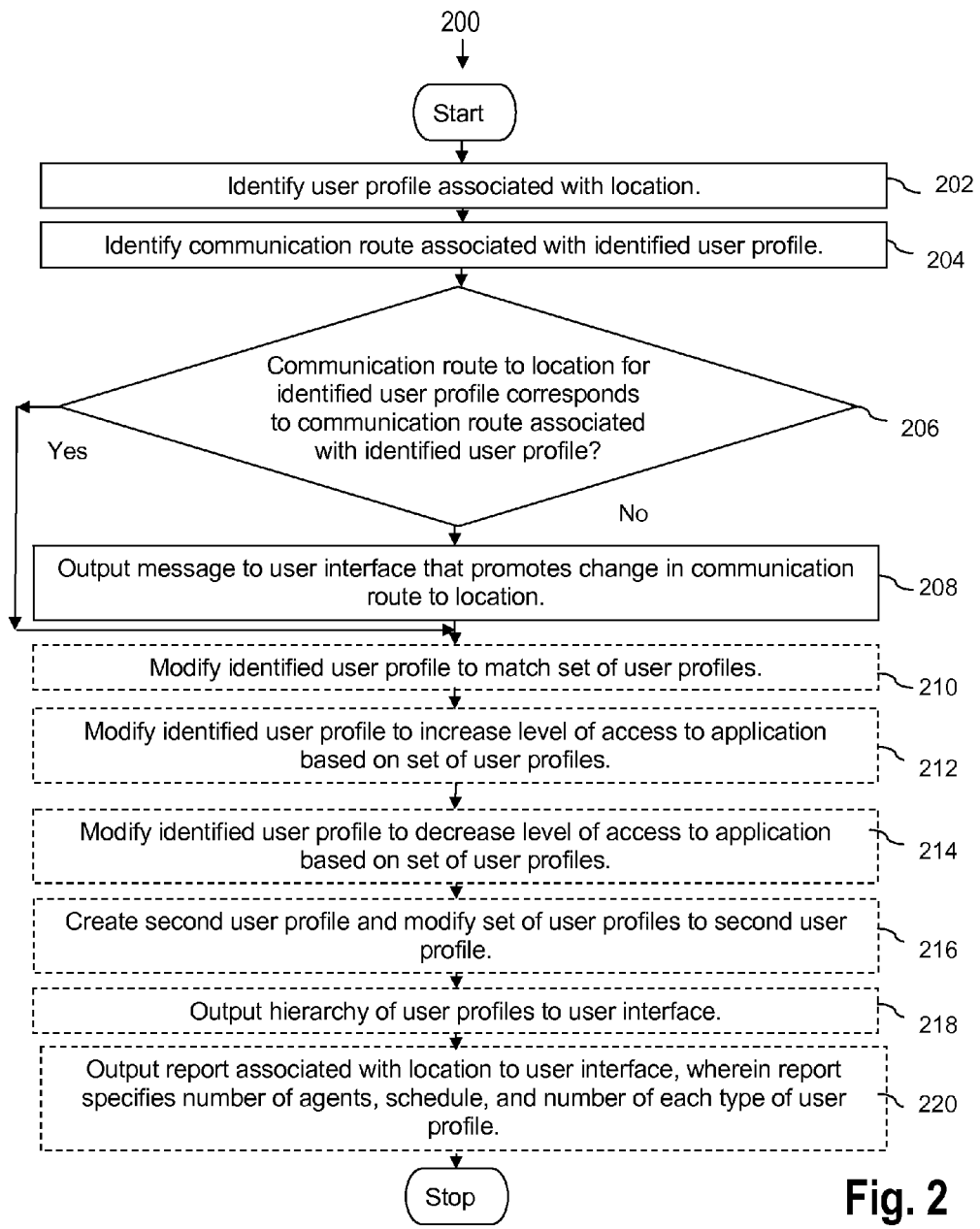
FIG. 2 is a flowchart of a method for customer service center database management according to some embodiments of the present disclosure.

FIG. 2 is a flowchart of a method 200 for customer service center database management according to some embodiments of the present disclosure. The system 100 may execute the method 200 to manage the customer service centers 102 and 104 based on information in the database 134.

In box 202, a user profile associated with a location is identified. For example, the management component 128 identifies a user profile for a customer care agent at the first customer service center 102.

In box 204, a communication route associated with an identified user profile is identified. For example, the management component 128 identifies a communication route to route a customer care request to a customer care agent.

In box 206, a determination is made whether a communication route to a location for an identified user profile corresponds to a communication route associated with an identified user profile. For example, the management component 128 determines whether the communication route to the customer care agent at the first customer service center 102 corresponds to a communication route that routes a customer care request to a customer care agent. If the communication route to the location for the identified user profile corresponds to the communication route associated with the identified user profile, the method 200 proceeds to box 210. If the communication route to the location for the identified user profile does not correspond to the communication route associated with the identified user profile, the method 200 continues to box 208.

In box 208, a message is output to a user interface that promotes a change in a communication route to a location. For example, the management component 128 outputs a message to the user interface 130 that promotes changing the communication route to the customer care agent at the first customer service center 102 to a communication route that routes a customer care request to the customer care agent.

In box 210, an identified user profile is optionally modified to match a set of user profiles. For example, the management component 128 modifies a user profile for a customer care agent supervisor at the first customer service center 102 to match a set of user profiles for customer care agent supervisors at the first customer service center 102.

In box 212, an identified user profile is optionally modified to increase a level of access to an application based on a set of user profiles. For example, the management component 128 increases the level of access to an application for the customer care agent supervisor to match the level of access to the application by the other customer care agent supervisors.

In box 214, an identified user profile is optionally modified to decrease a level of access to an application based on a set of user profiles. For example, the management component 128 decreases the level of access to an application for the customer care agent supervisor to match the level of access to the application by the other customer care agent supervisors.

In box 216, a second user profile is optionally created and a set of user profiles is optionally modified to the second user profile. For example, if a technical support agent at the first location 102 requests an increased level of access to a technical support application, and the management 132 approves this request, the management component 128 creates a new user profile for technical support agents at the first location 102 and modifies the user profiles of the technical support agents at the first location to match the newly created user profile.

In box 218, a hierarchy of user profiles is optionally output to a user interface. For example, the user interface 130 displays the user profiles for the customer care agents and the customer care supervisors at the first customer service center 102.

In box 220, a report associated with a location is optionally output to a user interface, wherein the report specifies a number of agents, a schedule, and a number of each type of user profile. For example, the management component 128 outputs a report that specifies how many agents work at each customer service center, how many agents are currently working at each customer service center, how many of each type of user profile is used at each customer service center, and how many of each type of user profile is currently being used at each customer service center.

Figure 3:
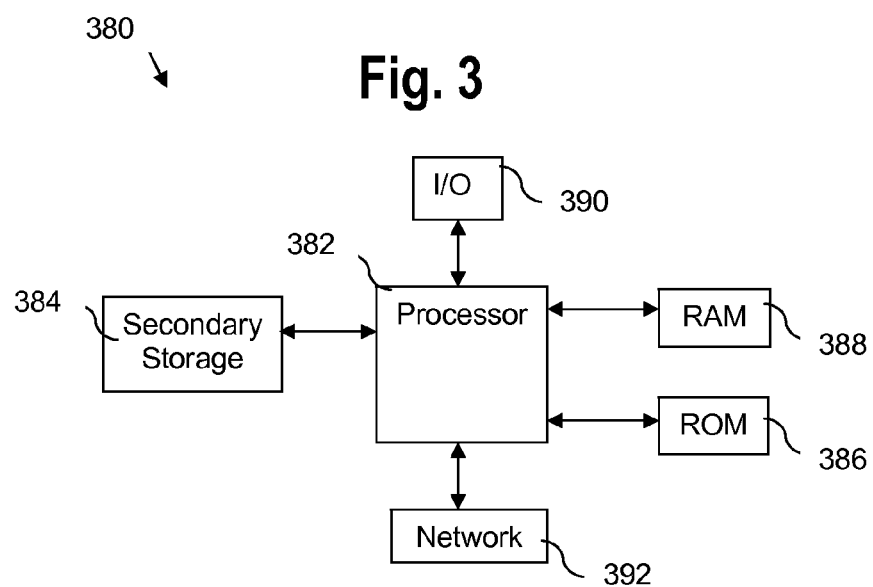
FIG. 3 shows an illustrative computer system suitable for implementing portions of the several embodiments of the present disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for customer service center database management, comprising:
   identifying, by a management component stored in a memory and executed by a processor, a customer service agent profile corresponding to a customer service center location;
   identifying, by the management component, a communication route corresponding to the identified customer service agent profile;
   determining, by the management component, that the communication route corresponding to the identified customer service agent profile does not correspond to a communication route to the customer service center location;
   outputting, by the management component, a message to a user interface that promotes changing the communication route corresponding to the identified customer service agent profile to the communication route to the customer service center location in response to the determination that the communication route corresponding to the identified customer service agent profile does not correspond to the communication route to the customer service center location, wherein changing the communication route corresponding to the customer service agent profile to the communication route to the customer service center location causes one or more customer service agents that correspond to the identified customer service agent profile and are located at the customer service center to receive one or more customer care requests;
   identifying, by the management component, an application accessible at the customer service center location based on the customer service agent profile corresponding to the customer service center location;
   identifying, by the management component, a set of hardware components for supporting the identified application;
   determining, by the management component, whether each set of hardware components at the customer service center location meets requirements for the identified set of hardware components; and
   outputting, by the management component, an upgrade message to the user interface that promotes an upgrade of a set of hardware components at the customer service center location in response to a determination that each set of hardware components at the customer service center location does not meet the requirements for the identified set of hardware components.

2. The method of claim 1, further comprising modifying, by the management component, the identified customer service agent profile to match a set of customer service agent profiles.

3. The method of claim 1, further comprising creating, by the management component, a second customer service agent profile and modifying a set of customer service agent profiles to match the second customer service agent profile.

4. The method of claim 1, further comprising outputting, by the management component, a report corresponding to the customer service center location to the user interface, wherein the report specifies a number of agents, a schedule, and a number of each type of customer service agent profiles.

5. The method of claim 1, further comprising modifying, by the management component, the identified customer service agent profile to increase a level of access to an application based on a set of customer service agent profiles.

6. The method of claim 1, further comprising modifying, by the management component, the identified customer service agent profile to decrease a level of access to an application based on a set of customer service agent profiles.

7. The method of claim 1, further comprising outputting, by the management component, a hierarchy of customer service agent profiles to the user interface.

8. The method of claim 7, wherein the hierarchy of customer service agent profiles identifies a level of access to an application corresponding to a subordinate customer service agent profile that is greater than a level of access to the application corresponding to a supervising customer service agent profile.

9. A system for customer service center database management, comprising:
   a processor;
   a memory; and
   a management component, stored in the memory, that when executed by the processor,
      identifies a first customer service agent profile corresponding to a first customer service center location that is most similar to a second customer service agent profile corresponding to a second customer service center location, wherein similarity is based on a plurality of access levels corresponding to a plurality of applications defined in the first and second customer service agent profiles,
      outputs a profile modification message to a user interface that promotes modification of the first customer service agent profile to match the second customer service agent profile,
      outputs a communication route change message to the user interface that promotes a changing a communication route corresponding to the second customer service agent profile to a communication route corresponding to the first customer service agent profile, wherein changing the communication route corresponding to the second customer service agent profile to the communication route corresponding to the first customer service agent profile causes one or more customer service agents that correspond to the modified first customer service agent profile and are located at the first customer service center to receive one or more customer care requests traditionally intended for customer service agents that correspond to the second customer service agent profile and are located at the second customer service center;
      identifies an application accessible at the first customer service center location based on the first customer service agent profile corresponding to the first customer service center location;
      identifies a set of hardware components for supporting the identified application;
      determines whether each set of hardware components at the first customer service center location meets requirements for the identified set of hardware components; and
      outputs an upgrade message to the user interface that promotes an upgrade of a set of hardware components at the first customer service center location in response to a determination that each set of hardware components at the first customer service center location does not meet the requirements for the identified set of hardware components.

10. The system of claim 9, wherein the first customer service center location comprises a first customer service center and the second customer service center location comprises a second customer service center.

11. The system of claim 9, wherein the first customer service agent profile is based on the first customer service center location and the second customer service agent profile is based on the second customer service center location.

12. The system of claim 9, wherein a first set of hardware components at the first customer service center location are based on the first customer service center location and a second set of hardware components at the second customer service center location are based on the second customer service center location.

13. The method of claim 1, wherein the application is at least one of installed on a computer at the customer service center location and accessed remotely from the customer service center location.

14. The method of claim 1, wherein the customer service agent profile corresponds to at least one of a technical support agent, a sales agent, a customer care agent, and a collections agent.

15. The method of claim 1, wherein the customer service agent profile specifies a corresponding level of access to each of a plurality of applications.

16. The method of claim 15, wherein the corresponding level of access to each of the plurality of applications comprises a level of access for a client communicating with the customer service center location.

17. The method of claim 15, wherein the corresponding level of access to each of the plurality of applications comprises accessible websites corresponding to a browser application.

18. The method of claim 1, wherein the set of hardware components at the customer service center location comprises at least one of a computer, a processor, a memory, an operating system, a monitor, a keyboard, a mouse, and a headset.

19. The method of claim 1, wherein identifying the application and identifying the set of hardware components is based on information corresponding to a plurality of applications and a plurality of sets of hardware components stored in a database.

* * * * *